United States Patent

[11] 3,617,640

[72] Inventor Henry J. Cichanowicz
1165 Westmoor Drive, Galion, Ohio 44820

[21] Appl. No. 696,054
[22] Filed Jan. 5, 1968
[45] Patented Nov. 2, 1971

[54] AUTOMATIC SIGNALING AND REPORTING SYSTEM
6 Claims, 12 Drawing Figs.

[52] U.S. Cl. .......... 179/5 P
[51] Int. Cl. .......... H04m 11/04
[50] Field of Search .......... 179/5, 5 P

[56] References Cited

UNITED STATES PATENTS 2,830,119 4/1958 Zimmerman .......... 179/5
3,287,500 11/1966 Moore, Jr. .......... 179/5

*Primary Examiner*—Kathleen H. Claffy
*Assistant Examiner*—David L. Stewart
*Attorney*—Fay, Sharpe & Mulholland

ABSTRACT: A system, capable of utilizing a conventional telephone network, for automatically dialing and reporting a monitored event, is disclosed which comprises means for recording a first frequency capable of acting both as a supervision tone, for maintaining the circuit connection to the telephone line, and as the dial-pulsing tone, for automatically dialing a receptor position, such as a fire station or police station. A recorded message in the audio frequency range is superimposed upon the first frequency. The superimposed first and second frequencies are prerecorded on a recording means, such as a track of a recording tape. A plurality of similar superpositions may be recorded on a multiple-track-recording tape network. In response to the actuation of a sensor monitoring a predetermined event, such as a fire or an intrusion, input circuit means are actuated to receive the output of the recording means which is representative of the monitored event, to the exclusion of would-be interrupting events on other channels. The input circuit means are coupled through amplifier circuit means to filter means. Filter means separate the supervision and dialing frequency from the audio frequency. Detector circuit means are connected to the filter circuit means for receiving the filtered supervision dialing tone. The programming of the network is such that a short period of time elapses between the actuation of the detector means and the acquisition of the dial tone before dialing is initiated. The electronic dialing is accomplished by successive actuation and deactuation of dialing pulses, particularly timed in accordance with telephone requirements. After the dialing has been completed, particular circuit features of the detector network are so arranged that the supervision tone maintains the circuit in an online condition, particularly where minute breakages and interruptions occur in the recording. After a short period of time has elapsed, a prerecorded audio message is transmitted through the telephone network. Power circuit means, channel-switching networks, shutoff networks, condition indicators, and the like, are further disclosed. In addition, an identifying signal network feature for use by the receiving party to attest to the integrity of the sending unit is disclosed to avoid false alarm actuation. In addition, an open microphone feature is disclosed whereby upon completion of the dialing cycle and transmission of the recorded message, the line will remain open to provide the receiver with the opportunity to monitor audibly the sending area.

INVENTOR.
HENRY J. CICHANOWICZ
BY
Fay, Sharpe & Mulholland
ATTORNEYS.

INVENTOR.
HENRY J. CICHANOWICZ
BY
Fay, Sharpe & Mulholland
ATTORNEYS.

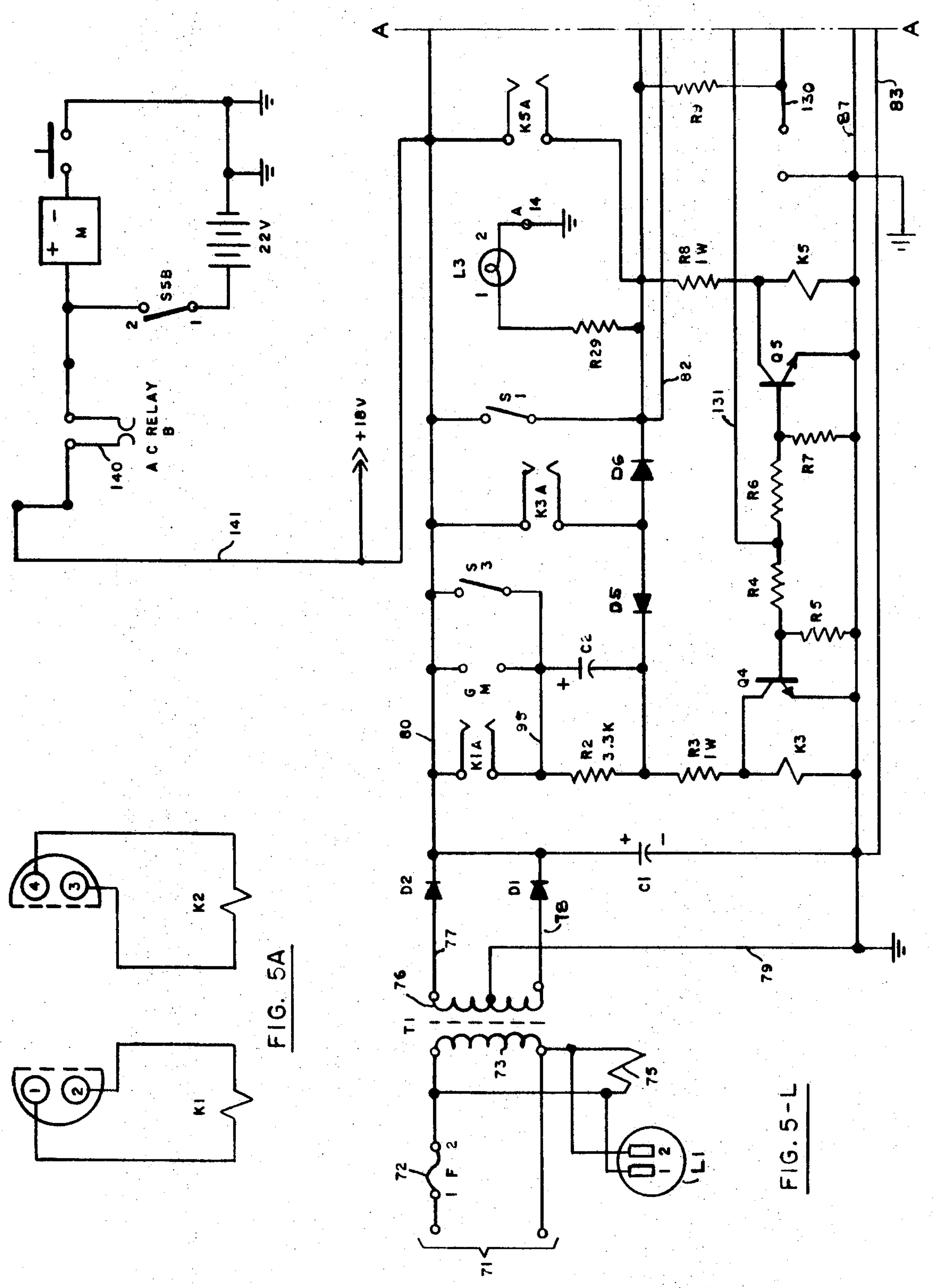
FIG. 5A, FIG. 5-L
INVENTOR.
HENRY J. CICHANOWICZ
BY
Fay, Sharpe & Mulholland
ATTORNEYS.

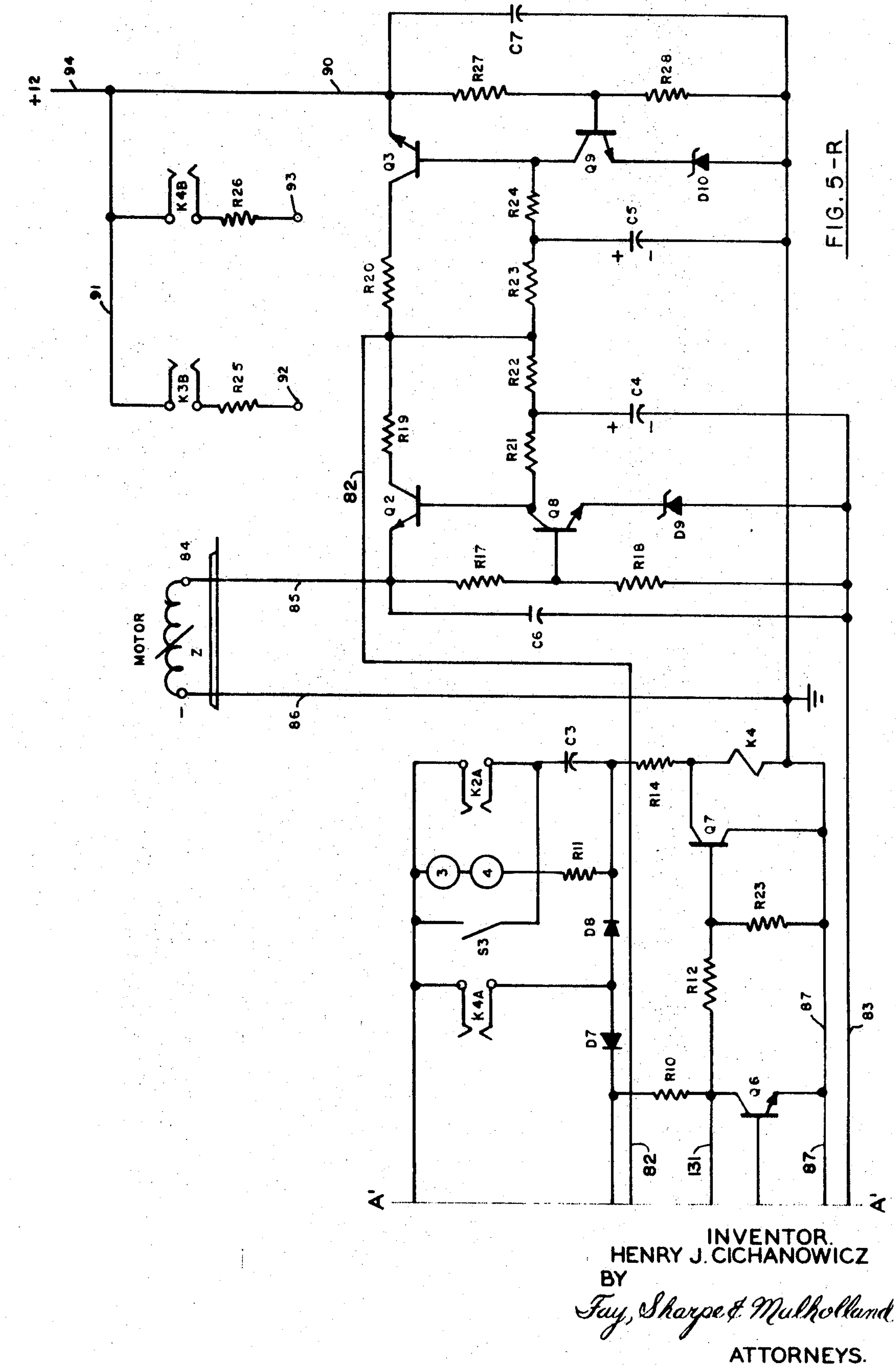
FIG. 5-R
INVENTOR.
HENRY J. CICHANOWICZ
BY
Fay, Sharpe & Mulholland
ATTORNEYS.

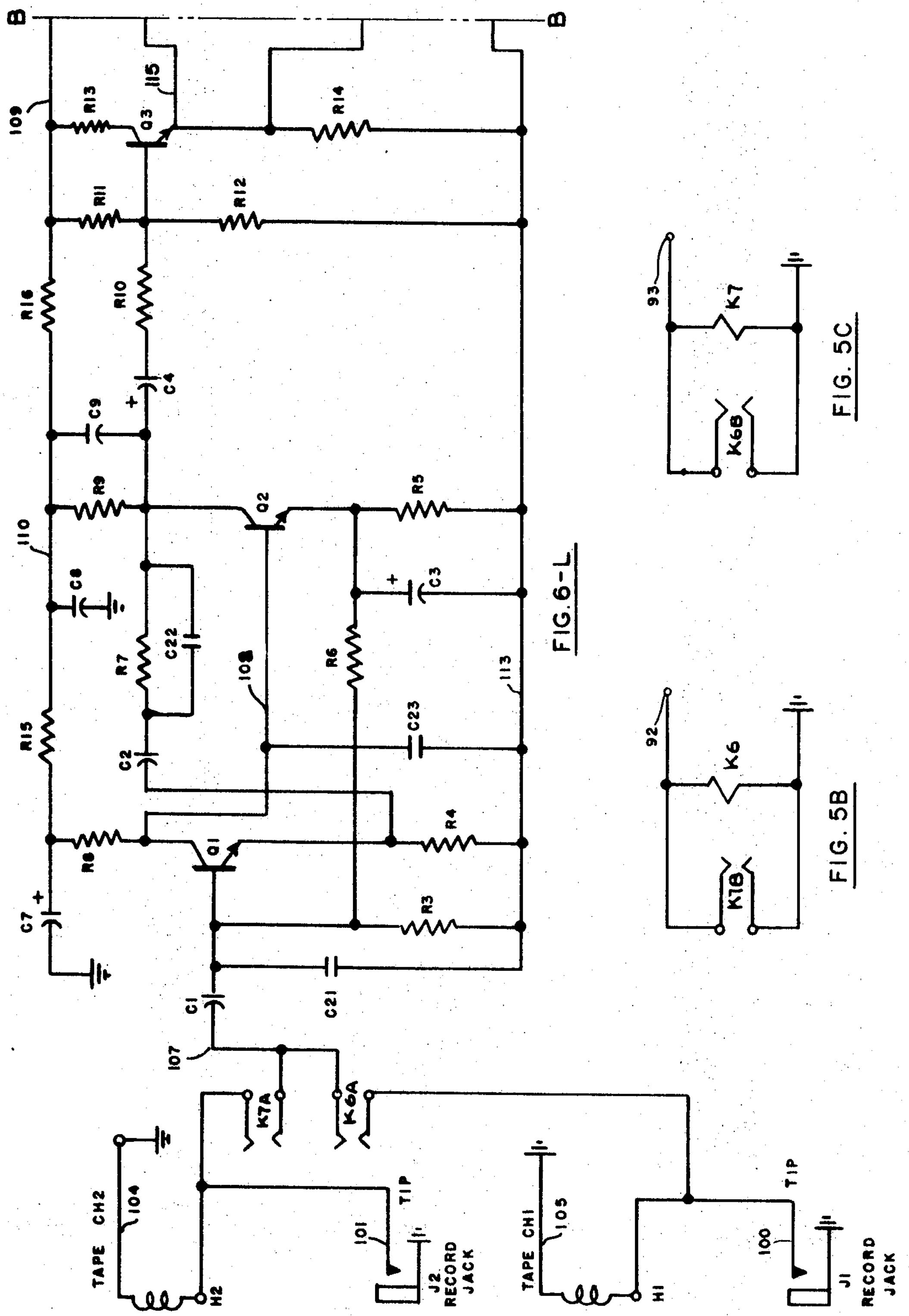
FIG. 6-L, FIG. 5C, FIG. 5B
INVENTOR.
HENRY J. CICHANOWICZ
BY
Fay, Sharpe & Mulholland
ATTORNEYS.

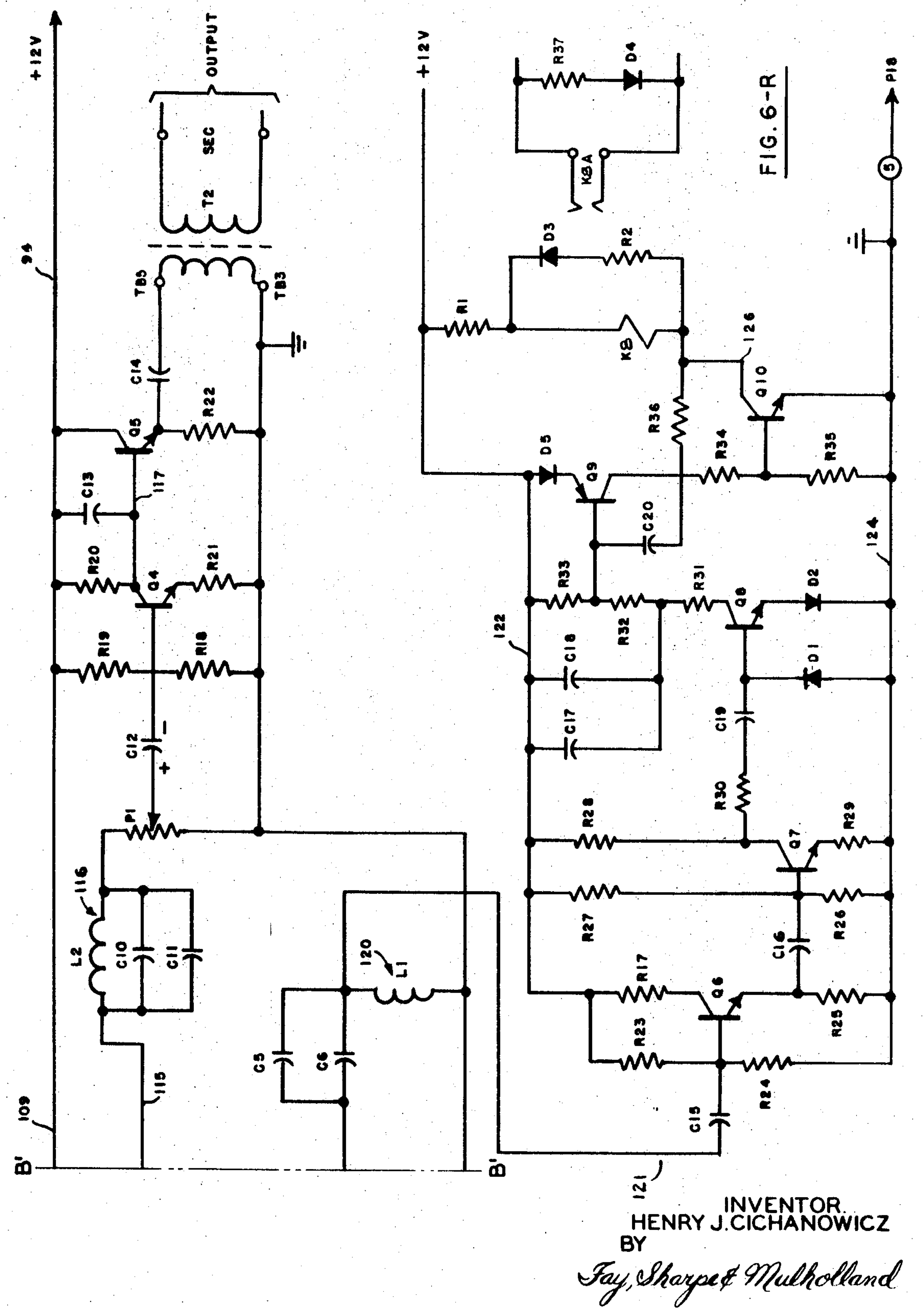
FIG. 6-R
INVENTOR.
HENRY J. CICHANOWICZ
BY
Fay, Sharpe & Mulholland
ATTORNEYS.

AUTOMATIC SIGNALING AND REPORTING SYSTEM

BACKGROUND OF THE INVENTION

This invention relates to alarm signal reporting systems. More particularly, this invention relates to an automatic alarm signal-reporting system employing conventional telephone lines. Still more particularly, this invention relates to an automatic signal alarm-reporting system employing conventional telephone lines, including means for automatically dialing a predetermined station and transmitting a prerecorded audible message indicative of the occurrence of an event which has been monitored.

One of the challenges which has long been faced the prior art of surveillance and reporting is an effective, yet convenient, and inexpensive solution to the problem of simultaneously monitoring a plurality of events, such as fire, burglary, intrusion, refrigeration temperatures, and the like, at a particular location, and in the event of the occurrence of one of the events, notifying the proper receptor party of the happening. In the instance of fire on a particular premises, it would, of course, be obviously desirable to notify the appropriate fire department. In the event of burglary or intrusion on the same premises, it would be desirable to notify the appropriate police authorities. In the case of malfunctions of still a third nature, such as an abnormal rise or fall in refrigeration temperatures, such as in a supermarket, it may be appropriate to notify servicing personnel. In each of the above events, it may also well be desirable to notify the owner of the premises, the manager, assistant manager, and the like of the occurrence of the monitored event.

One of the most elementary solutions to the problem is the provision of continuous manned supervision of the premises, in the form of a watchman, whose primary function is to observe, periodically, signals indicative of the events which are desired to be monitored. Such a solution is costly because of the number of man-hours necessarily involved. Moreover, such a solution is inefficient particularly where the premises are large, for the reason that an event could well occur without observance by the watchman until an inappropriately later time. Moreover, delayed discovery of such an event may compound the damage. It is, of course, desirable in the case of a burglary, not only to immediately detect the burglary or intrusion, but to apprehend the burglar or intruder. In the case of a fire, early detection is necessary to minimize loss due to the occurrence.

Another solution to the problem of monitoring a plurality of events on a particular premises is the provision of particular and special alarm networks which may be remotely monitored either at local or at central stations. One form of solution contemplated in this arrangement is the provision at a central location on the premises of a plurality of indicators, each of which may be indicative of the occurrence of the monitored event. In this manner, an observer, upon perusing the alarm signal, is immediately apprised of the events remote from the central location, but within the premises and may at once undertake effective remedies. However, as before, continuous manned supervision of the premises is costly and inefficient, as well as possibly resulting in physical harm to the observer in the case of burglary or intrusion.

A modification of the above solution is that of providing a central location remote from the monitored premises. In this manner, the remote central location may indeed monitor the events of several protected premises, but the delays and inefficiencies inherent in such an arrangement are still manifest. A particular difficulty in this solution is the need to provide electrical communication network lines between the monitored premises and the remote central location. Such installation, it can well be understood, can be very costly, particularly where the remote location is far-removed from the monitored premises.

To solve the problems of the need for extensive intervening networks and cost, prior art solutions have attempted to utilize means for effectively utilizing conventional telephone lines. One such arrangement is the use of leased lines, where the telephone authority is reimbursed for the use of the line on a periodic basis, whether the lines are in fact used or unused. Once again, such solutions have proved extremely costly.

Accordingly, it is desirable to provide a system wherein conventional telephone lines may be used as desired to monitor a plurality of events and to transmit a prerecorded message indicative of the nature of the event.

To this end, the prior art has proffered several approaches to the solution of the problem of using conventional telephone lines. One approach is to provide means for mechanically dialing the predetermined receptor number to report a prerecorded message. An example of such devices is a mechanical apparatus for rotating the telephone dial in a predetermined pattern. These types of devices are inherently inaccurate because of their mechanical nature and difficult to develop to ensure that the proper number is dialed.

Still other means for automatically dialing and reporting have been provided for prerecording a message and dialing a desired number prior to reporting the message. Such means include means for maintaining an off-hook condition of the telephone during the audible portion of the recorded message. The most elementary of such systems are limited to arrangements in which one number and one message are recorded.

When such prior art systems use latching arrangements separate from the pulsing arrangements to maintain the off-hook condition during the voice or reporting portion of the message, coordinating difficulties often occur. Moreover, failure of electrical continuity of the recording means or tape through a recording head, and the like may cause inadvertent "drop-out" and loss of contact with the receiving station.

Accordingly, prior art systems have used complex equipment largely characterized by a lack of flexibility and generally limited to a minimum of numbers and calls.

SUMMARY OF THE INVENTION

Directed primarily to the efficient, inexpensive and convenient solution to the deficiencies and shortcomings promulgated by prior art solutions to the above-identified problems, apparatus according to the invention includes recording means which utilize a first tone capable of performing both the dial pulsing and the off-hook supervision functions upon which is superimposed the prerecorded audible voice message. In its preferred form, the invention comprises a multitrack continuous tape loop, each track including a superimposed plurality of tones as indicated above and further individually indicative of an event to be monitored. Thus, in this manner, a plurality of events may be monitored, and the prerecorded message individually fitted to the monitored event. Moreover, a plurality of predetermined numbers to be called if the event is sensed may likewise be provided.

Means for powering the unit on either conventional voltages or frequencies, such as 110 volts AC 60 cycle, or on battery power are provided.

Input circuit means with suitable interlocks are provided so that upon actuation of a sensor, with the resultant appropriate activation of a particular channel on the recording means, the input circuit means operate to foreclose simultaneously dialing a second event. In the alternative, means for establishing circuit priority may be included.

The signal available at the output of the input circuit means is thus provided to amplifier means to increase the available signal level. A filter network is in circuit with the output of the amplifier means and provides means for separating the supervision-dialing frequency from the audio frequency. From a first output of the filter means, the recorded audio message is coupled through a suitable connector available from the telephone utility to the transmission line. The supervision-dialing tone is provided through detector means including suitable amplifying and holding network means. The holding means comprises a resistance-capacitive network so proportioned to foreclose interruption of the dialing or holding function during minute interruptions of the supervision frequency. From the holding circuit means, the signal is provided to contacts which couple into the telephone handset network to furnish the closure for off-hook and dialing purposes.

Because of the particular nature of dialing, which will be hereinafter explained, and in order to utilize the particular holding network of the nature indicated, it is necessary to program this dialing impulse by the use of a programmer which compensates for the delay of the signal in the detecting network.

Ancillary features of this invention include means for utilizing conventional line power sources or batteries, as may be desired. Moreover, means for establishing the signal integrity are disclosed. In addition an open-microphone feature may be incorporated into the circuit to permit monitoring of the premises through an open microphone after the telephone contact with the receiving end have been achieved. In addition, a shutoff network and various condition indicators are also provided.

Accordingly, it is a primary object of this invention to provide an automatic alarm signaling and reporting system which conveniently and efficiently overcomes the shortcomings of the prior art.

It is a further object of this invention to provide a system capable of monitoring a plurality of diverse events and automatically dialing and reporting such events to the proper predetermined receiving party as soon as they occur.

It is still further object of this invention to provide an alarm signaling and reporting system capable of utilizing conventional telephone equipment, without the necessity of leased transmission lines, so that when an event is monitored, the system will automatically dial any predetermined telephone number and audibly report the event being monitored.

It is a still further object of this invention to provide recording means in which a dialing-supervision tone is superimposed upon a prerecorded message to overcome the problems of voice breakdown of the tone and system dropouts caused by recording and circuit imperfections.

It is still a further object of this invention to provide an automatic alarm signaling and reporting system which is capable of monitoring a plurality of events through multiple channels, each of which includes a superimposed-recorded message upon a dialing tone.

It is a still further object of this invention to provide means for automatically selecting a proper channel, dialing a predetermined number, audibly reporting the alarm, and automatically reporting a subsequent alarm to another interested party.

It is still a further object of this invention to provide means for automatically determining a proper channel, dialing a predetermined number, audibly reporting an alarm by a prerecorded message, and automatically reporting a subsequent alarm on another channel, should this condition subsequently exist.

Another object of this invention is to provide means capable of utilizing a conventional telephone network for automatically dialing a predetermined number or numbers and automatically reporting an event, the means further characterized in that the problems of dropouts due to imperfections in the recording means are overcome.

It is still a further object of this invention to provide means which may be conventionally powered or battery powered for automatically signaling and reporting a monitored event.

Further objects and aims of this invention will be apparent upon a perusal of the accompanying drawings and a review of the detailed specification which follows.

BRIEF DESCRIPTION OF THE DRAWINGS

FIGS. 5L, 5R and 6L, 6R (left and right) taken together, illustrate the detailed circuitry of one operative embodiment of the circuitry according to the invention;

FIG. 5A shows a connector for a two-channel system for use with the circuit of FIG. 5. FIGS. 5B and 5C show components of an interlock arrangement for the two-channel system.

DESCRIPTION OF THE PREFERRED EMBODIMENTS

Figure 1:
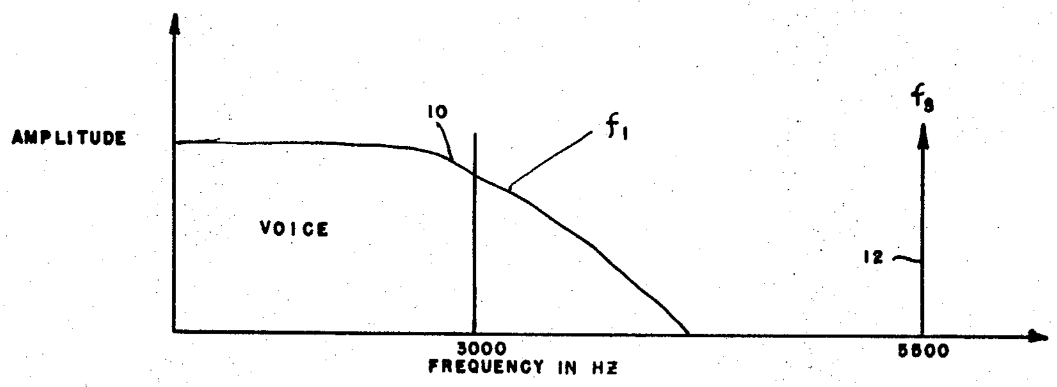
FIG. 1 is a graphical illustration of the audible recorded message and the dial and supervision tone as indicated on a plot of amplitude versus frequency for a single channel of a suitable means for recording.

FIG. 1 is a graphical illustration of a plot of amplitude versus frequency of the signals which are superimposed one upon the other a single track of the recording means. In the preferred embodiment, a plot of voice energy indicated at 10 which contains the prerecorded audible message is sharply attenuated above a particular frequency which, in one preferred embodiment is typically 3,000 Hz. A plot of the supervision dialing tone is shown at 12 and is denominated $f_s$. Supervision tone 12 is typically 5,500 Hz. for recording of the dial pulses and supervising the off-hook state of the receiver. As will hereinafter be explained, the dial pulses of predetermined multiplicity and duration are recorded as suitably interrupted bursts of frequency $f_s$. The desired supervision frequency tone is partially determined by the roll-off attenuation frequency of voice plot 10, as well as the other circuit parameters, taking into consideration inherent problems of high-frequency distribution.

In essence, the relationship between prerecorded voice frequencies 10 and the supervision tone 12 should be such that the intelligible integrity of the prerecorded message should be assured. Moreover, the tone 12 should be conveniently separable from the supervision tone so that separation without overly expensive components may be achieved, while yet tending toward the lower frequencies to avoid high frequency recording and playback problems.

Figure 2:
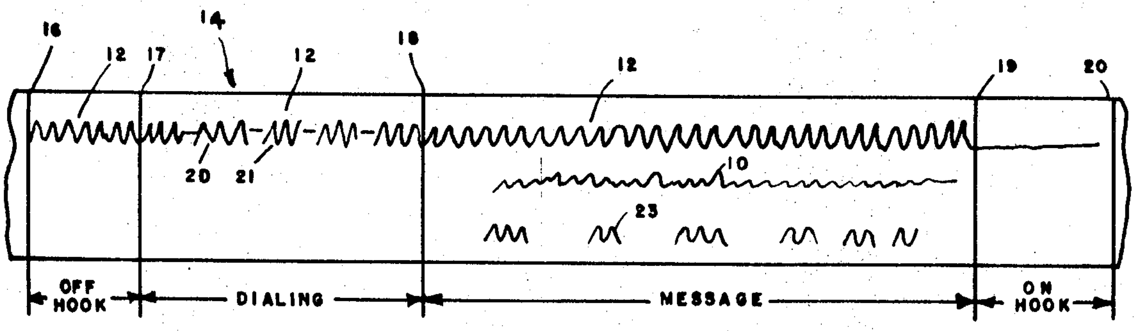
FIG. 2 is a schematic arrangement of a single channel of the means for recording illustrating the various sequences and separation of frequencies to achieve the desired result.

FIG. 2 is an illustration of one track of the recording means which is indicative of a particular monitored event. In the manner depicted, FIG. 2 illustrates a typical sequence of events culminating in a single dialing of a predetermined number and a single reporting of the monitored event. A continuous tape loop is shown generally at 14 as comprising the voice frequency 10 and the supervision frequency 12. By way of example, suppose that an event, such as a fire, is monitored at the tape position indicated by numeral 16. The circuitry according to the invention, as will be hereinafter explained, is actuated and applies the supervision tone 12 to the conventional telephone circuit for a period of about 5 seconds, or to tape position 17. Typically, the time lapse is sufficient to acquire a dial tone on the conventional line, and may be of greater or lesser duration as the installation warrants.

The period on the tape denoted between positions 17 and 18 as the tape passes through the read head for the recording mechanism is denominated the dialing segment of the supervision tone 12. The dialing portion is generally depicted by a plurality of interrupted tone bursts, typically 20 and 21, of a duration and repeatability which is representative of the number to be called.

Upon the completion of the dialing function, as between tape positions 17 and 18 respectively, and after a lapse of a suitable time for telephone connections, if desirable, the predetermined audible message, indicated between tape positions 18 and 19, is transmitted over the conventional telephone network during an off-hook cycle. It should be noted that the supervision tone 12, which is once again uninterrupted, remains to maintain the telephone circuit in an off-hook condition. During this time, the voice record, i.e. the audible frequency is presented to the receiving station. The voice frequency 10 is illustrated as separate from the supervision tone 12, although on the tape, the tone 10 is in reality superimposed upon 12 and electronically separated, as will hereinafter be discussed. Typically, the voice message will apprise the receiving station that, for purposes of the illustration, "there is a fire at (indicate the premises) and that this is a recorded message."

Where further desired, an identifying tone 23, intermittently repeated, and of a frequency that will not interfere with either the supervision tone 12 or the recorded message 10, may be provided to ensure signal integrity. Intermittent frequency 23 may be denominated as an identifying signal for use by the receiving party so to attest to the integrity of the sending unit. By use of such an identifying signal 23, false alarm actuation may be avoided.

Upon completion of the message, as illustrated by position 19 on the tape, the frequency variations on the tape cease, causing circuit interruption and the electrical return of the telephone handset to its "on-hook" condition as illustrated between points 19 and 20 on tape 14.

At point 20, in accordance with the desires of the utilizer, or the authorities, the hereinbefore described sequence may be repeated and directed to the same receiving authority for verification. Other variations in call sequence are possible. The message, for example, could be followed by a transmission of the same message to interested third parties, such as the owner or manager of the premises. It can thus be understood that a monitored event may be reported to any number of a plurality of receiving stations sequentially.

Figure 3:
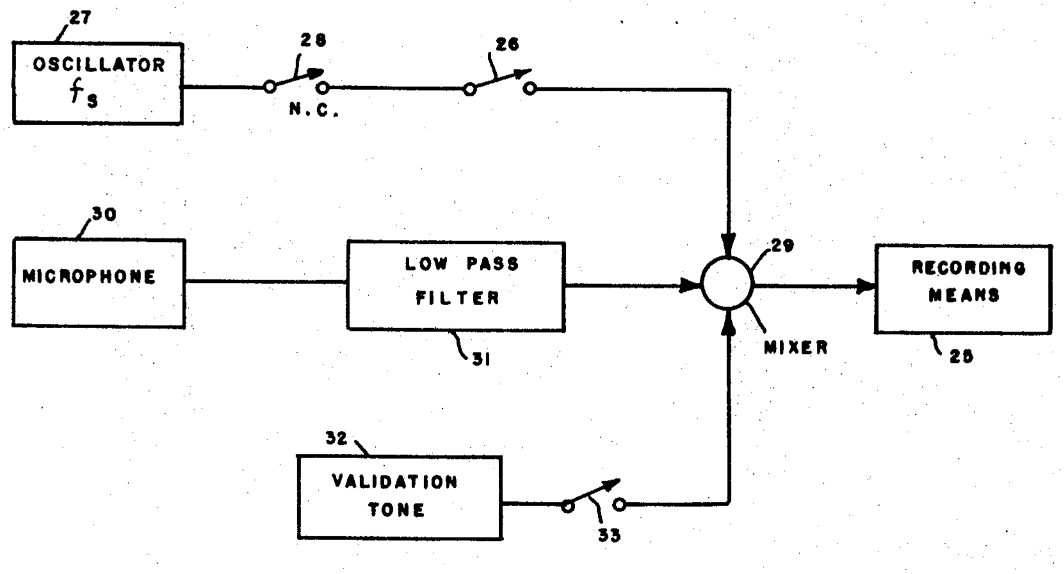
FIG. 3 is a block diagram of the programming network for recording the prerecorded message and the dialing-supervision tone.

FIG. 3 is a block diagram of a programmer which may be used to record the recorded message together with the supervision tone and the validation tone on the recording means. Recording means are illustrated generally at 25 for receiving the recorded tone and message in a conventional manner. Recording means may include, in the preferred embodiment, a continuous loop tape deck comprising a plurality of channels or tracks, whereupon the recording process is performed for each channel or track individually. After the contents of the message, the repeatability of the message, and the telephone number or numbers of the desired receiving station or stations have been determined, the operator is set to record. Switch 26 is representative of the hook switch of a telephone handset. For purposes of recording, upon the actuation of switch 26 representative of position 16 on the tape loop of FIG. 2, oscillator 27 provides supervision frequency tone $f_s$ through normally closed switch 28 to mixer network 29.

Normally closed switch 28 is representative of the telephone dial of conventional handsets and serves to interrupt the supervision tone $f_s$ to provide the dialing tone. One convenient method for providing the interruption of proper multiplicity and duration is to insert at point 28 in the circuit a conventional rotatable make-break switch such as that used on conventional dials. Of course, attention must be paid to the point at which dialing starts, it being desired to have an off-hook condition to provide a dial tone such as that indicated between points 16 and 17 of FIG. 2.

Simultaneously, upon the completion of the insertion of the dialing tone on the tape by interruption of the make-break switch 28, and restoration of switch 28 to its normally closed condition, the predetermined voice message may be inserted on the tape through microphone 30 and low-pass filter 31 into mixer 29. As discussed in connection with FIG. 2, the audible message is not inserted onto the tape until position 18 on the tape is reached and terminates at about position 19, when the voice message is complete.

Low-pass filter 31 serves to pass the low-frequency portions of the recorded message, while attenuating the high-frequency portions as shown in FIG. 1. Mixer 29 may be termed the conventional mixer network for the superposition of such frequency tones. Examples of suitable mixer networks include transformers and resistive matching networks for mixing the voice and supervision frequencies at the proper level.

Validation tone oscillator 32 and an associated normally open switch 33 are also provided to place the validation tone 23 on the recorded channel between points 18 and 19 as shown in FIG. 2. Validation tone oscillator 32 may be a separate oscillator, or may be any suitable means of obtaining a predetermined validation frequency 23, intermittently positioned on the tape for integrity as hereinbefore stated.

Figure 4:
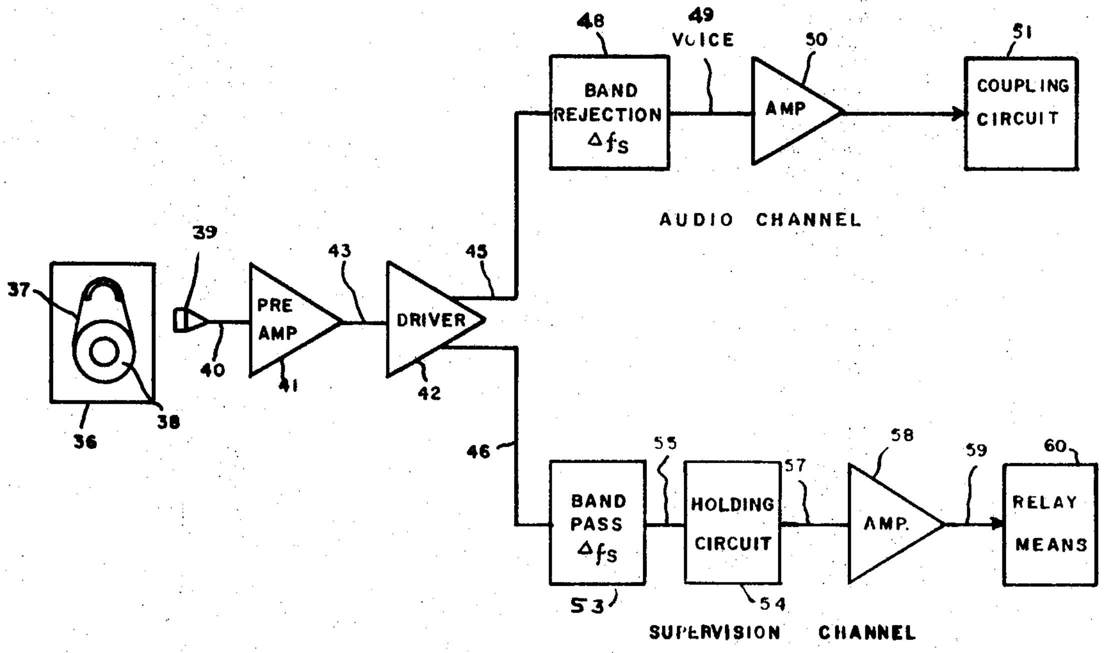
FIG. 4 is a block diagram of a system according to the invention.

FIG. 4 illustrates, in block form, means according to the invention for receiving the continuous tape loop, message, validation, and supervision tones recorded thereon and translating these sources of information. Recording means are shown at 36 as comprising a continuous tape loop 37 rotatably wound on a cartridge 38 in juxtaposition to a read head 39 for extracting the recorded information from the tape 37. Recording means 36 may be of a conventionally obtainable type suitable for use in a single or a plural track system. In its preferred embodiment, however, the invention utilizes a plural track system for monitoring a plurality of events as hereinbefore explained. Read head 39 contains a like number of channels and is capable of extracting information from the tape loop. As will be hereinafter explained, a particular source of information is extracted from one track to the exclusion of other sources of information from the remaining tracks of the tape.

Tape 37 may have a conductive foil or other suitable marking on a portion thereof as a reference or start point. Upon activation of a sensor, for example a thermostatic unit, a recorder motor (not shown) is activated. The read or play back head 39 may be suitably coupled to a preamplifier network 41 to obtain the desired magnitude of signal. Preamplifier 41 may be coupled through a driver amplifier 42 which is suitably coupled to preamplifier 41 through intervening circuit means 43. The output of the driver amplifier section is divided into two channels 45 and 46 respectively.

The circuit means of channel 45 are designed to emphasize the prerecorded audible tone or voice path, previously denoted by numeral 10 in FIGS. 1 and 2, and to reject the supervision-dialing tone $f_s$, denoted by numeral 12 in the same FIGS. Otherwise, the supervision-dialing tone would present itself to the ear of the listener as a distracting background tone. To achieve this band rejection, a suitable band rejection filter 48 may be provided, the output of which is coupled via circuit means 49 to amplifier 50 for coupling to the telephone instrument via coupling circuit 51.

Amplifier 50 in the voice channel 45 amplifies the prerecorded audible signal to the proper level. Coupling circuit 51 may be one that acoustically couples the signals to the telephone instrument or directly couples, either electrically or magnetically, the available prerecorded audible signal to the telephone line. Coupling circuits 51 are generally commercially available from the local telephone authorities for these purposes.

Similarly, channel 46 is directed to the supervision-dialing frequency. Band pass filter 53 passes supervision tone $f_s$ via holding network 54 by way of circuit means 55. Holding network 54, which will be hereinafter explained in greater detail, achieves a time delay in the dropout of the supervision tone to alleviate problems caused by voice breakdown and tape dropouts, as well as by minute imperfections and variations in the recording means and in the intervening circuit means.

The output of holding network 54 is coupled via suitable circuit means 57 to a driver amplifier 58 which in turn is coupled via circuit means 59 to relay means 60. Relay means 60 periodically activate and deactivate the telephone line during the dialing process to obtain the desired predetermined telephone number of the receiving station. Moreover, when relay means 60 remains closed, in accordance with the presence of supervision signal $f_s$, the off-hook condition of the telephone is maintained, as set forth in FIGS. 1 and 2.

At this point, the aims of the invention, by perusal of FIGS. 1–4 become clear. Upon the receipt of a signal from a sensor monitoring a predetermined event, such as a fire, the appropriate message which has been directed to the fire authorities, and to whomever else it is desired to be sent, is preinserted as was explained in connection with FIG. 2 on the tape. The superimposed frequencies are sensed by the recording head 39 whereupon the supervision channel, via suitable filter means closes the circuit via relay means 60 to provide an off-hook condition corresponding to the portion of tape 14 between points 16 and 17 of FIG. 2.

Thereupon, as set forth between points 17 and 18 of tape 14 in FIG. 2, relay means 60 are activated and deactivated in accordance with the presence or absence of intermittent pulses 20 and 21 on tape 14. This accomplishes the dialing function. Thereafter, supervision frequency 12 maintains relay 60 in a closed, or "on-line" - off-hook condition, between points 18 and 19 of the representative portion of the tape 14. Simultaneously, between points 18 and 19, but not therebefore and not thereafter, the recorded audible message set forth at 10 passes through the voice channel 45 to be amplified and coupled to the receiving station which has as previously been described been notified whose number was previously dialed in the interim of the tape between 17 and 18.

It should be understood from a perusal of FIG. 4, that various alternative means for accomplishing the same result are available. For example, by proper selection of the circuit components, perhaps the preamplifier could be eliminated. Moreover, perhaps a single output from the driver amplifier could drive a single filter whose characteristics approximate that of filters 48 and 53. In that event, the filter would be a dual output capable of amplification 50, as necessary, and for coupling into coupling circuit 51. The other output of the common filter 48, 53 would be used to actuate the holding circuit 54 and through amplifier 58, if necessary, to actuate and deactuate relay means 60 to achieve the dialing and holding function.

FIGS. 5 and 6, taken together, illustrate the circuit detail of an operative embodiment of a device according to the invention. A suitable source of power is shown at 71, for example 110 volts 60 cycle AC. Source 71 is coupled via safety means 72 to the primary 73 of transformer T1. Illumination means L1 is likewise coupled to the transformer T1 via an AC relay 75 which in turn is in parallel across the primary 73 of transformer T1. L1 thus apprises the user of the invention that the system is on AC power.

Transformer T1 has a center-tapped secondary 76. Diodes D1 and D2 are in circuit with the secondary 76 of T1 to provide full wave rectification via leads 77 and 78. The cathodes of diodes D1 and D2 are coupled to one terminal of capacitor C1, which serves as a filter capacitor for the full wave rectified AC input wave. The center cap of secondary 76 of transformer T1 is connected to a source of reference potential via lead 79.

Lead 80 is connected to the positive side of filter capacitor C1 to serve as a common source for the various switching channels. In the embodiment illustrated, only two channels are shown, it being clearly understood that any number of plurality of channels may be used in accordance with the needs of the system with the resultant expansion of the necessary circuitry and effective utilization, within the skill of one working in the art of the necessary additional parameters.

To provide the 12-volt regulated DC bias source, transistors Q2 and Q8, each including a collector and an emitter are series connected in a conventional fashion to provide the regulated source of power. The end of resistor R19 opposite its common point with R20 is connected to the collector of transistor Q2. The base of transistor Q2 is connected to the collector of transistor Q8. The emitter of transistor Q2 is connected via a suitable biasing resistor R17 to the base of transistor Q8. An additional biasing resistor R18 is connected to the base of transistor Q8 and to lead 83 which in turn returns to the source of reference potential at the negative terminal of filter capacitor C1.

For regulation purposes, a Zener diode D9 is connected to the emitter of transistor Q8 and to lead 83.

Motor 84, illustratively depicted, is connected via leads 85 and 86 to the emitter of Q2 and to a source of reference potential through lead 87. Thus, it can be understood that transistors Q2 and Q8 act as series regulators to provide a regulated source of voltage to the motor 84.

Motor 84 drives the recording means, as will be hereinafter discussed. Since the continuous tape loop in the recording means, as previously described in FIG. 4, requires an adherence to the proper timing, it is desirable that regulated voltage be provided to the motor to eliminate variations in speed, and hence in the dialing function, due to variations in the supplied voltage.

Transistors Q3 and Q9, each including collector, emitter, and base leads, are similarly connected to provide regulated voltage for the preamplifier, audio-amplifier and detector circuits, as will hereinafter be discussed. Resistor R20 is connected to lead 82, and acts as a voltage-dropping resistor to the collector of transistor Q3. The emitter of transistor Q3 is connected via resistor R27 to the base of Q9. The base of Q9 is connected to resistor R28 is and thus to lead 87 which is connected in turn to a source of reference potential. Resistors R27 and R28 provide a voltage divider for proper biasing of the base of transistor Q9.

Similarly, the emitter of transistor Q9 is connected to a Zener diode D10 for voltage regulation purposes. A voltage divider network R21 and R22 is connected between the collector of Q8 and the common point of resistors R19 and R20 which by lead 82 is connected to a source of potential 80 via actuation of a sensor, to be hereinafter discussed, or switch S1. At the common point between resistors R21 and R22, capacitor C4 is connected as well as to lead 83 which is also connected to a source of reference potential. The circuit containing elements R21, R22 and C4 provides an isolated bias for the collector of Q8 and a suitable time constant to prevent instantaneous fluctuations of the potential applied thereto. Similarly, resistors R23 and R24 are connected in series between the common points of R19 and R20 to the collector of transistor Q9. Thus, resistors R23 and R24 provide a source of bias potential to the collector of Q9 and suitable filtering via capacitor C5. The time constants of resistors R23, R24, and C5 are such as to prevent instantaneous fluctuations in the collector of Q9. Capacitor C6 is connected to the emitter of Q2 and to a source of reference potential via lead 83 to provide an additional source of filtering and isolation to series regulator Q2–Q8.

Similarly, capacitor C7 is connected between the emitter of Q3 and a source of reference potential via lead 87 to provide isolation and filtering for spurious signals for series regulator Q3–Q9.

Lead 90 is connected to the emitter of series regulator Q3–Q9 and is connected to contacts K3B and K4B via common connection 91. A voltage dropping resistor R25 is connected between contacts K3B and terminal 92. Similarly, voltage-dropping resistor R26 is connected between contact K4B and terminal 93. Terminals 92 and 93 will provide, as will hereinafter be seen, the supply voltage for the channel-switching arrangement.

As hereinbefore indicated, two channels are associated with the circuit means according to the invention, the number of channels being a similar function of the number of tracks that are built into the tape deck. FIG. 5*a* depicts a convenient commercially available connector assembly for use in a two-channel system, the bias sources not being shown. By the application of a suitable voltage to the commercially available connector across coil K1, a first channel would be energized. Similarly, by the application of a suitable voltage across coil K2, the alternate channel would be energized. The commercially available connector is, of course, suitably biased and connected to the biasing system of the unit, and is capable of a response when a sensor unit is closed. Thus, sensor units could be provided, for the embodiment depicted, for sensing fire, such as by thermostatic action, or burglary or intrusion by use of pressure-sensitive means, photoelectric cells, pressure pads, magnetic or electrically conductive tape, and the like, as well as temperature sensitive means for utilization and refrigeration systems, or any other of a wide variety of known sensor units.

Assume that one of these connector-sensor units senses the presence of an event desired to be monitored. Consistent with the previous examples, suppose that by thermostatic action a heat buildup is sensed, indicating perhaps the presence of a fire, although the presence of a fire could similarly be sensed by smoke-sensitive devices. Thus, the desired voltage is connected across the coil K1 and contact K1A closes in response to the energization of coil K1.

Since contact K1A is connected to bias source 80, capacitor C2 is thus charged to the voltage on line 80 via lead 95. Capacitor C2 charges via resistor R3 through coil K3 to lead 87 and consequently to a source of reference potential to complete the circuit. Thus, simultaneously, coil K3 is energized, closing contact K3A which is connected to lead 80 and to the common connection of the anodes of diodes D5 and D6. Contact K3A thus latches the coil K3 in an energized state via lead 80, diode D5, resistor R3, and coil K3. Resistor R2 which in in parallel with capacitor C2 provides a discharge path for capacitor C2.

Simultaneously with the energization of coil K3, contact K3B, connected to the emitter of Q3 via lead 91 and 90 and to terminal 92 via R25, is likewise energized.

FIGS. 5B and 5C, when taken with FIG. 5A together with FIGS 5 and 6, illustrate an interlock arrangement for the dual channel system under consideration. In FIG. 5B, coil K6 is connected between terminal 92 and a source of reference potential. Contact K7B is in parallel with coil K6. Similarly, as seen in FIG. 5C, coil K7 is connected to terminal 93 and contact K6B is connected in parallel with K7 being connected between the terminal 93 and a source of reference potential.

Continuing with the previous development, upon closure of contact K3B in response to actuation of coil K3, which in turn was responsive to the energization of coil K1 in response to a sensor, regulated voltage is supplied from regulator Q3 and Q9 via leads 90 and 91 to terminal 92, hence energizing coil K6. Contact K6B in FIG. 5C has been closed in response to the energization of coil K6, thus, shorting out coil K7 and preventing the interruption of the normal circuit progression by subsequent actuation of coil K7. Thus, the interlock is provided when coil K6 is actuated.

Diodes D6 and D7, which have been connected to a source of potential at lead 80 when contact K3A is closed, serve as isolation diodes and provide the function of isolating channels 1 and 2, as well as providing a means for energizing motor 84 and regulator Q9–Q3 via switch S1 without need for energizing the first channel via coil K3 or the second channel via coil K4.

By way of completeness of explanation, suppose that no signal has been received across coil K1 but that a signal has been received across coil K2 by activation of a sensor different from the sensor which actuated coil K1. In this event, coil K2 is energized, and contact K2A is closed, thus charging capacitor C3 via K4 and R14. Coil K4 is thus now energized by the closure of contact K2A thus closing contact K4A to provide the self-completing latching function similar to the manner as previously described. Simultaneously, contact K4B closes, connecting the potential at the emitter of Q3 via lead 90 to contact K4B and resistor R26 to terminal 93. Terminal 93 is thus energized an coil K7 is also energized. Coil K6 is incapable of being energized by contact K7B and is thus foreclosed from interruption from the normal circuit functions.

For recording purposes it is necessary to energize the motor 84 but not couple the head into the preamplifier lead 107. Thus, coils K6 and K7 and subsequently coils K3 and K4 should not be energized. Switch S1 is provided for this purpose. Upon closure of switch S1, coil K5 is energized through resistor R8. Contact K5A closes and provides a self-completing latching function. Diodes D6 and D7 restrict the charging current thus preventing the energization of K3 or K4 and K6 or K7. Thus, the record head is not coupled to the amplifier so that normal record levels may be impressed across the head via the appropriate record jack.

For periodic testing and for demonstration purposes, the channels may also be actuated by a contact closure. When it is desired to test the operability of the unit, switch S3 is closed. Diodes D5 and D8 restrict the charging current to the unit. For example, considering D5, the charging current from C2 after actuation of switch S3 achieves the same result as closure of contact K1A in response to energization of coil K1 which results from actuation of the associated sensor.

Accordingly, the previously described latching feature is operative and the bus 80 is available to the remainder of the unit via lead 82 as hereinbefore described. Switch S3 may take the form of a single-pole double-throw switch for actuating the desired channel, either channel 1 or channel 2. It is understood that where a plurality of the channels is used, it may be that the plurality of similar switches will be necessary.

It has been found desirable, for safety reasons are well as for insurance purposes, to review periodically the operability of the circuit under simulated function. In the preferred embodiment shown, this can easily be accomplished by closure of switch S3. Upon closure of switch S3 in the desired channel, the desired channel is operated as if a monitored event had occurred. Assume that actuation of channel one has occurred, as previously described. Thus, motor 84 is actuated via lead 82 applying bias through regulator Q2–Q8 and, similarly, power is available at terminal 92, while contact K3B has been closed. Contact K6B and coil K7 have likewise been interlocked. With the actuation of coil K6, tip 100 of the record jack couples the signal from the first channel 105 of tape 37 via closed contact K6A to the input of the amplifier network via lead 107.

While read tip 101 is similarly sensing the pulses on the second channel 104 of tape 36, contact K7A remains open and the signals are thus foreclosed, as well as by the interlock function as hereinbefore explained. It can be understood, that any number of the plurality of circuits ultimately could be coupled in similar interlock arrangements to lead 107 for ultimate utilization by the amplifier circuit according to the invention.

Signals which are apparent at the output of the input circuit means are applied via lead 107 through a coupling capacitor C1 to the base of transistor Q1. The collector of transistor Q1 is connected via lead 108 to the base of transistor Q2. Transistors Q1 and Q2 together provide a two-stage direct-coupled amplifier for amplification of the signals apparent on the tape to usable proportions.

Bias voltage is supplied from terminal 94, connected via lead 90 to the series regulator Q3 and Q9 (shown in FIG. 5) via lead 109, resistor R16, lead 110 and resistor R15 to provide biasing for the two-stage amplifier. For biasing Q1, emitter resistor R4 is connected from a source of reference potential 113 to the emitter of Q1. Collector resistor R8 is connected from the collector of Q1 to the common point between capacitor C7 and resistor R15. Resistors R8 and R15 form collector resistors for ultimate connection to the bias lead 110 and to the source of bias potential via R16 and lead 109. The resistors R8 and R15, together with capacitor C7 form a decoupling network to the power supply to prevent low-frequency feedback to the system through the power supply and biasing system.

The base of Q1 is similarly biased to a source of reference potential at lead 113 via resistor R3. C21 is provided in parallel therewith to provide desired input impedance characteristics as well as to provide isolation of the base of Q1 and suitable charging and discharging functions.

The emitter of transistor Q2 is connected to a source of reference potential via lead 113 by emitter resistor R5. Similarly, collector resistors R9 and R16 of Q2 together with capacitor C9 form a decoupling network for transistor Q2 to eliminate low-frequency feedback primarily, and high-frequency feedback through the power network. Emitter resistor R5 of Q2 is decoupled to a source of reference potential via lead 113 by capacitor C3.

Direct current feedback from the emitter of Q2 to the base of Q1 is provided by way of resistor R6 for direct current stabilization. Similarly, alternating current feedback is provided from the collector of Q2 to the emitter of Q1 by a parallel network comprising resistor R7 and capacitor C22, series-coupled to capacitor C2. The magnitude of capacitor C2 and R7 are arranged to compensate for low-frequency rolloff and the playback from the recording means. Thus, since the lower frequencies are emphasized for the audible portion of the prerecorded message, R7 and C2 are designed to emphasize the low frequency to compensate for normal rolloff. Capacitor C22, in parallel with resistor R7 in the alternating current feedback network is sized to rolloff the frequency above about 30 kc. Similarly, capacitor C21, provided from the base of Q1 to a source of reference potential, is likewise a decoupling capacitor to provide additional rolloff of the higher frequencies.

The overall requirements of the amplifier thus described, are that it have a gain commensurate with the relationship of the input signals provided in the recording means and with remaining circuit parameters, and that it have a reasonably flat frequency response from about 100 cycles per second up to about 10,000 cycles per second. Above 10,000 c.p.s., it is generally preferable to size the components to initiate again attenuation to prevent high-frequency oscillation.

The output from the amplifier means comprising transistors Q1 and Q2 and the associated circuitry is coupled via coupling capacitor C4 via resistor R10 to the base of transistor Q3. Transistor Q3 may be termed a driver amplifier is arranged in an emitter-follower configuration. Base bias is provided by resistors R11 and R12 in series between bias lead 109 and a source of reference potential by way of lead 113, with the base of transistor Q3 being connected to the common point therebetween. The collector of transistor Q3 is biased by a collector resistor R13 and the emitter is suitably biased by an emitter resistor R14.

The output from transistor Q3 is taken from its emitter via lead 115 to drive a filter network shown generally at 116 as comprising inductor L2, capacitor C10 and capacitor C11 in a parallel relationship. Filter network 116 forms a trap for the 5,500-cycle frequency while passing the prerecorded audiofrequency, previously designated in this application as voice frequency 10. The output from filter network 116 is provided to a potentiometer P1 for convenient adjustment of the audiovolume provided to the telephone line.

The output of potentiometer P1 is coupled via capacitor C12 to the base of transistor Q4. Transistor Q4 basically comprises a class A amplifier having its base bias determined by resistors R18 and R19 connected between a source of reference potential 113 and bias lead 109. The collector is biased via resistor R20 and the emitter is biased by resistor R21. Capacitor C13 in parallel with collector resistor R20 provides additional high-frequency rolloff at this particular stage.

The output from transistor Q4 is taken via lead 117 to the base of transistor Q5 which is in an emitter follower configuration. The collector in this particular instance is directly connected to lead 109 for biasing and the emitter of Q5 is biased to the source of reference potential via emitter resistor R22. The output is taken from the emitter of Q5 via coupling capacitor C14. In the particular embodiment shown, the output, which at this point contains the filtered prerecorded audio frequencies, and hence the prerecorded message is magnetically coupled via transformer T2 to the telephone line.

It can be understood, however, that other methods of coupling the prerecorded message to the telephone lines are likewise available. One such means utilizes direct coupling into the telephone lines and another utilizes a predetermined telephone connection available from the telephone utility.

Returning to the emitter of Q3, the output of emitter follower Q3 is also coupled to a filter network 120 across emitter resistor R14. A series resonant circuit is formed by the parallel combination of capacitors C5 and C6 in series with inductor L1 to provide a resonant circuit tuned to the frequency of the supervision tone, i.e. 5,500 c.p.s. Thus, the filter will pass 5,500 c.p.s., or its supervision frequency, and will tend to attenuate noise and other frequencies, including the frequencies of the audio message.

The output of filter 120 is connected via lead 121 and capacitor C15 to the base of transistor Q6.

It is to be understood, however, that the signal which exists on lead 121 as a result of the filtering action of filter 120 primarily consists of the supervision tone.

Transistor Q6 is designed to be an isolating amplifier stage to present a reasonably high impedance via lead 121 to filter 120 and a low impedance looking ahead to the subsequent stages. Thus, lead 122 is similarly connected to terminal 94 which is the output of the series regulator Q3–Q9 as previously discussed and provides a regulated source of biased voltage. The base of transistor Q6 is biased by way of resistors R23 and R24, the collector of Q6 being biased by way of resistor R17 and the emitter of Q6 being biased by way of resistor R25. The output of the isolating amplifier stage Q6 is coupled to the base of transistor Q7 by way of capacitor C16.

Transistor Q7 is essentially a class A amplifier having a relatively low gain. Its base is biased via resistors R26 and R27, its collector is biased via resistor R28 and its emitter is biased by resister R29 in a conventional manner. The output from transistor Q7 is taken from the collector thereof via resistor R30 across resistor R28, through capacitor C19, into the base of transistor Q8.

Transistors Q8, Q9, and Q10 together with the accompanying circuit elements comprise the holding network to obviate the problems of inadvertent dropout as hereinbefore mentioned.

Transistor Q8 is normally biased off, as are transistors Q9 and Q10. When the supervision frequency tone appears at the base of Q8 via coupling capacitor C19, the positive excursions of the alternating supervision-dialing frequency will cause transistor Q8 to conduct because of diode D2 in the emitter circuit of Q8. When transistor Q8 conducts, capacitor C17 and C18 will be charged through resistor R31 between bias source 122 and source of reference potential 124. The time constant of capacitors C17 and C18 together with resistor R31 and the dynamic impedance of transistor Q8 are so proportioned that capacitors C17 and C18 will completely charge in one or two cycles of the supervision-dialing frequency tone.

At the base of transistor Q8, upon the negative excursions of the supervision tone coupled to the base of Q8 by way of capacitor C19, diode D1 is so poled to permit a fast return path for the negative excursions to thus maintain the proper DC polarity across coupling capacitor C19.

Thus, it can be seen that upon negative excursions applied to the base of transistor Q8, capacitors C17 and C18, having previously been charged, possess very nearly the bias voltage contained on lead 122. Since Q8 is nonconductive, the discharge path for capacitors C17 and C18 is necessarily through resistors R32 and R33. Resistors R32 and R33 are so proportioned that the discharge time constant is in the neighborhood of 20–25 milliseconds.

With the discharge time constant thus proportioned, transistor Q9, which is normally off, will be turned on and remain on until capacitors C17 and C18 are discharged. Thus, even though transistor Q8 is becoming conductive and nonconductive in accordance with the 5,500 cycle supervision tone frequency, Q9 remains in the conductive state by virtue of the charge storage on capacitors C17 and C18.

Similarly, transistor Q10, which is normally nonconductive begins to conduct by virtue of its connection to the collector of Q9 via resistor R34 when transistor Q9 is conductive. Resistor R35 provides a bias for the base of Q10 by connecting the base to a source of reference potential 124.

The output of transistor Q10 is taken from the collector thereof via lead 126 connected to one terminal of coil K8. Coil K8 is in series with resistor R1 which is connected to lead 122 and hence is the bias potential. Contacts K8A are responsive to the energization and deenergization of coil K8. A suppression network comprising diode D3 and resistor R2 is connected in parallel with coil K8 to prevent spikes and transients. Similarly, suppression network D4 and resistor R37 is connected in parallel with contact K3A.

The collector of transistor Q10 is also connected to the base of Q9 by lead 126 via capacitor C20 and resistor R36. Resistor R36 and capacitor C20 provide an AC feedback path to provide snap action in turning transistor Q10 on and off.

In order to better understand the operation of transistors Q8, Q9, and Q10 with respect to the time delays to avoid innocent dropout, it should be remembered that in normal telephone operation, the telephone handset is lifted from the telephone desk set. When the handset is thus removed, the so-called "off-hook condition" exists. Thereafter, a dial tone is furnished, generally in less than 5 or 10 seconds. Upon acquisition of the dial tone, dialing may then commence. The telephone network is arranged so that dial pulses are provided to the closed network, as indicated by the presence of a dial tone, at the rate of 10 pulses per second, or 100 milliseconds per pulse. Thus, in dialing zero, or the operator, the 10 digits of the dial are utilized. Since each digit, or pulse representative of the digit, is dialed on the dial return at approximately 100 milliseconds, the total time for dialing zero is approximately 1 second. Similarly, in dialing the numeral 4, four digits of the dial are traversed, in approximately 400 milliseconds. As the dial is returning on a conventional handset, the dial is in the process of repeatedly interrupting the connection with the telephone line.

It has been determined, and is thus desirable that the ratio of circuit connection, to circuit disconnection for each pulse is a ratio of 60/40. Thus, in dialing the operator there are 10 distinct pulses, of 100 milliseconds each. Of the 100 milliseconds, the connection to the telephone line is thus closed for 40 milliseconds and open for 60 milliseconds of the time period.

It has been found feasible to incorporate a time delay of approximately 20–25 milliseconds into the circuit. Thus the signals appearing at the base of Q8 during the supervision cycle are not susceptible to dropout for at least this period during the existence of minute imperfection in the recording means or in minor circuit variances.

However, in order to achieve this holding action, it must be remembered that the supervision tone is alternately made and broken to provide the dialing impulse. Accordingly, it is necessary to compensate for this time delay from the time the supervision tone is intentionally broken as indicative of a predetermined signal and the time in which the broken signal appears in terms of contact K3A. This delay being in the order of 20–25 milliseconds, this compensation must be programmed to the programmer unit.

Figure 7:
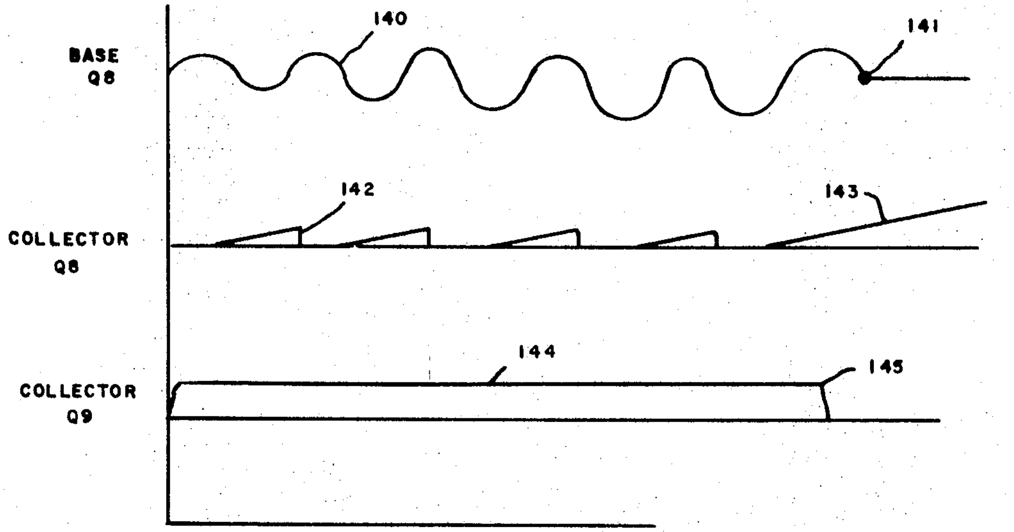
FIG. 7 is a diagram of various waveforms in the circuit of FIGS. 5 and 6.

FIG. 7 depicts general waveforms at certain points in the holding network. Curve 140 represents the waveform of the voltage applied to the base of transistor Q8. Curve 142 represents the waveform at the collector of Q8, the slight variation from zero potential being caused by the back-bias potential of the limiting diode D2.

Curve 144 shows the waveform of the voltage at the collector of transistor Q9 which is held nearly constant by the action of the holding network C17, C18, R32 and R33.

Point 141 of curve 140 is illustrative of a position where the input signal to the holding circuit fails for one reason or another. It can thus be seen by the portion of the curve labeled 143 that the collector voltage of transistor Q8 rises as the holding network loses its charge. During the rise in the collector voltage of Q8, the collector voltage of Q9 remains at its previously determined potential. However, after a predetermined period, i.e. 20–25 milliseconds, as previously set forth, transistor Q9 returns to its nonconductive state, as seen by the fall of its collector potential at point 145.

Upon completion of the dialing and transmission of the recorded message, and upon the completion of the repeat cycles where utilized, the shutoff cycle will now be described.

Returning to FIG. 5, transistors Q4, Q5 and Q7 are in a normally nonconductive state. Transistor Q4 is in parallel with coil K3; transistor Q5 is in parallel with coil K5; and transistor Q7 is in parallel with coil K4. Thus, since the transistors Q4, Q5 and Q7 are nonconductive, coils K3, K4 and K5 are capable of being charged as hereinbefore described.

One convenient means fore shutting off the apparatus according to the invention is to provide the tape with a portion of conductive foil in conjunction with a sensor unit. When the conductive foil, indicated as an open contact between terminals 130 and source of reference potential 87, the base of transistor Q6 assumes the reference potential, in this case ground. Q6, which is normally conducting, becomes nonconductive thus permitting base drive current to flow to the base of transistor Q7 by way of resistors R12 and R10.

Resistor R9 is used to bias the base of transistor Q6. Similarly, base drive current is permitted to flow via resistor R10, lead 131 and resistor R4 to the base of transistor Q4, and, similarly, from lead 131 via resistor R6 to the base of Q5. Accordingly, upon the presence of a conductive foil on the tape between terminal 130 thus grounding terminal 130, base drive current is provided to both transistors Q4 and Q5 thus making the transistors Q4 and Q5 conductive and thus bypassing coils K3 and K4 with the resultant effect that contacts K3B or K4B, depending upon which channel was activated, are bypassed and thus opened. Where it is desired to use an alarm light, auxiliary circuitry may be provided to perform this function.

Conveniently associated with the before-described circuitry is a battery network which operates from a standby battery of suitable potential capable of powering motor 84 and the basic circuitry as hereinbefore described. Alternating current relay 140 in response to delay coil 75 is provided for inserting the battery circuit into operation in the event that there is a loss of AC power. As can be seen in a portion of the AC relay, denominated in 140*a*, the AC circuit is disconnected from the power source and the battery-powered circuit is inserted into the circuit by way of lead 141. Switch S5*b* is responsive to actuation of the AC relay and closes the circuits applying a 22-volt standby battery into operation.

Thus the power means for the system may either be a conventional AC source, or battery-powered and in the event of loss of AC power, the changeover will be automatically effected.

While it will be apparent that the embodiment of the invention herein disclosed is well calculated to fulfill the objects of the invention, it will be appreciated that the invention is susceptible to modification, variation, and change without departing from the proper scope or fair meaning of the appended claims.

I claim:

1. An electrical system for automatically dialing a predetermined telephone number and reporting a monitored event comprising:

sensor means for monitoring a predetermined event;

recording means comprising at least a single track, including both a first signal recorded on said track which is indicative of a first frequency capable of both dialing a predetermined receptor station by repetitively making and breaking a circuit to said station for predetermined times during a dialing period and acting as a holding signal during predetermined nondialing periods, and a second signal recorded on said track which is indicative of a second frequency which is capable of being separated from said first frequency, said second signal comprising a predetermined intelligible audio message capable of indicating the nature of the monitored event, said recording means being responsive to the actuation of said sensor means;

input circuit means having an input and an output, the input of said input circuit means being capable of simultaneously receiving said first and second signals when said recording means are actuated in response to said sensor means;

filter circuit means having an input and at least a pair of outputs, said input of said filter circuit means being in circuit with the output of said input circuit means for simultaneously receiving said first and second signals and separating said first signal from said second signal so that said first signal appears at one of said pair of outputs, and said second signal appears at the other of said pair of outputs, said filter circuit means comprising a first passive filter network which receives both said first signal and said second signal and provides a representation of said first signal at said one of said pair of outputs, and a second passive filter network which receives both said first signal and said second signal and provides a representation of said second signal at the other of said pair of outputs;

detector circuit means for receiving said representation of said first signal including an isolating circuit and a holding circuit, said isolating circuit being in circuit with said one of said pair of outputs for isolating said filter circuit means from said holding circuit, said holding circuit being in circuit with the output of said isolating circuit, said detector circuit means further including electrical circuit means in circuit with said holding circuit capable of making and breaking connection with a telephone line for predetermined times during the dialing period in response to said representation of said first signal and for maintaining a circuit connection with said telephone line during said predetermined nondialing periods, said holding circuit including a first transistor and a second transistor in circuit with said first transistor and said electrical circuit means, each of said first and second transistors being normally biased to a nonconductive state, and charging means in circuit with said second transistor for maintaining said second transistor in a conductive state during predetermined nondialing periods of said first signal and for at least partially determining the time at which, after receipt of said first signal by said detector, said second transistor changes from its nonconductive to a conductive state, said first transistor repetitively changing from a conductive to a nonconductive state in response to said first signal and at the same frequency thereof; and first output circuit means in circuit with said other of the outputs of said filter means for receiving said representation of said second signal, said output circuit means being capable of circuit connection to a telephone line to transmit said intelligible audio message to a predetermined receptor station upon completion of dialing and during a selected portion of said predetermined nondialing period.

2. The system as defined in claim 1 further including means for establishing signal integrity, said means including a third signal recorded on said track which is capable of serving as an identifying tone to the receptor station, said third signal being transmitted to said receptor station together with said intelligible audio message.

3. The system as defined in claim 1 wherein said recording means includes a plurality of tracks, each of which contains superimposed first and second signals.

4. The system as defined in claim 3 wherein said input circuit means further includes means for interlocking said tracks so that a dialing and reporting cycle indicative of one event may proceed uninterrupted, thus foreclosing the simultaneous dialing of a second event.

5. The system as defined in claim 4 wherein said input circuit means further includes means for amplifying the signal received from said recording means.

6. The system as defined in claim 1 further including means for providing a source of power to the system, said means further including means for providing a conventional AC power source and a battery source;

relay means in circuit with the conventional power source and said battery source in such a manner that upon loss of AC power, the battery source is immediately utilized.

* * * * *